United States Patent
Chang et al.

(10) Patent No.: US 7,475,463 B1
(45) Date of Patent: Jan. 13, 2009

(54) CUTTING MACHINE

(75) Inventors: Paul Chang, Daya Township (TW); Tsair-Rong Chen, Hemei Township (TW); Jeen-Sheen Row, Mialoi (TW); Yuan-Fu Tsai, Daya Township (TW)

(73) Assignees: Buffalo Machinery Co., Ltd., Taichung (TW); The Department of Electrical Engineering, National Chang-Hua University of Education, Changhua (TW)

( * ) Notice: Subject to any disclaimer, the term of this patent is extended or adjusted under 35 U.S.C. 154(b) by 0 days.

(21) Appl. No.: 12/061,880

(22) Filed: Apr. 3, 2008

(51) Int. Cl.
*B23B 29/32* (2006.01)
*B23B 39/20* (2006.01)

(52) U.S. Cl. .................. 29/40; 29/48.5 R; 74/813 R

(58) Field of Classification Search .............. 29/40, 29/39, 42, 48.5 R, 48.5 A, 35.5; 82/159, 82/120, 121; 74/813 R, 813 L, 813 C, 826
See application file for complete search history.

(56) References Cited

U.S. PATENT DOCUMENTS

| 6,704,983 | B2 * | 3/2004 | Matsumoto | 29/40 |
| 6,785,943 | B2 * | 9/2004 | Sheehan et al. | 29/40 |

FOREIGN PATENT DOCUMENTS

JP        06-000743 A  *  1/1994

* cited by examiner

*Primary Examiner*—Erica E Cadugan
(74) *Attorney, Agent, or Firm*—Vedder Price P.C.

(57) ABSTRACT

A cutting machine includes: a machine body; a hollow piston; a first shaft extending into the piston, co-movable with the piston relative to the machine body along a first axis, and rotatable about the first axis relative to the piston; a second shaft rotatable about a second axis and coupled to the first shaft when the first shaft is disposed at a first axial position; a rotary cutter holder rotatable about the first axis and coupled to the second shaft; a third shaft rotatable about the first axis and coupled to the first shaft when the first shaft is disposed at a second axial position; and a driving unit for driving rotation of the first shaft about the first axis.

6 Claims, 6 Drawing Sheets

US 7,475,463 B1

CUTTING MACHINE

BACKGROUND OF THE INVENTION

1. Field of the Invention

The invention relates to a cutting machine, more particularly to a cutting machine including a splined shaft rotatable about an axis and movable along the axis for switching to different operations.

2. Description of the Related Art

Referring to FIG. 1, a conventional cutting machine 10 is shown to include a machine body 11, a driving unit 12 mounted on the machine body 11, a first piston unit 13 mounted on the machine body 11 and movable along a first axis defined by the first piston unit 13, and a rotary cutter holder 14 mounted rotatably on an outer side of the machine body 11. The cutting machine 10 further includes a first shaft 111 mounted in the machine body 11. The first shaft 111 has one end provided with a shaft gear 1112 meshing with a driving gear 121 of the driving unit 12 for power transmission, and an opposite end extending into the first piston unit 13 and formed with a male spline gear 1111. The first piston unit 13 includes a piston 131, a tubular sleeve 132 journalled and extending into the piston 131 and formed with a long female spline gear 1321 having a portion engaging the spline gear 1111, and a first transmission gear 133 radiating from an outer end of the tubular sleeve 132. The rotary cutter holder 14 includes a holder housing 140, a second shaft 141 extending into the holder housing 140 and having a driven end extending into the tubular sleeve 32 and provided with a male spline gear 1411 engaging another portion of the female spline gear 1321, and a cutter shaft 142 mounted in the holder housing 1401 and coupled to the second shaft 141 and a cutter 143. In such a manner, the first shaft 111 is operable to drive the second shaft 141 and thereby further drive the cutter shaft 142 for driving rotation of the cutter 143. The cutting machine 10 further includes a third shaft 112 mounted in the machine body 11, a second transmission gear 113 mounted to an end of the third shaft 112, an outer race 114 coupled fixedly to the rotary cutter holder 14 and the third shaft 112, an inner race 115 fitted coaxially into the outer race 114 and fixed to the machine body 11, a meshing piston 116 movable to couple the outer and inner races 114, 115 so as to lock the third shaft 112 against rotation, and a driving shaft 117 for driving movement of the meshing piston 116 to thereby decouple the outer and inner races 114, 115 so as to permit rotation of the third shaft 112. The piston 131 is powered by a hydraulic system (not shown) to move away from the rotary cutter holder 14 so as to disengage the female spline gear 1321 of the tubular sleeve 132 from the male spline gear 1411 of the second shaft 141, and to engage the first transmission gear 133 with the second transmission gear 113 to thereby enable the first shaft 111 to drive the third shaft 112. When the driving shaft 117 drives the meshing piston 116 to decouple the outer and inner races 114, 115, the third shaft 112 is operable to rotate the rotary cutter holder 14. On the other hand, when the driving shaft 117 drives the meshing piston 116 to couple the outer and inner races 114, 115, the rotary cutter holder 14 is locked to the machine body 11 through the inner race 115.

Since the female spline gear 1321 is relatively long so as to be able to engage simultaneously the male spline gear 1111 of the first shaft 111 and the male spline gear 1411 of the second shaft 141, it tends to deform and requires a high mechanical strength to prevent deformation from occurring. As such, manufacturing cost thereof is increased and the cutting precision deteriorates after a period of use.

SUMMARY OF THE INVENTION

Therefore, an object of the present invention is to provide a cutting machine that can overcome the aforesaid drawbacks associated with the prior art.

Accordingly, a cutting machine of the present invention comprises: a machine body defining parallel first and second cylindrical holes; a hollow piston extending into the first cylindrical hole and movable along a first axis defined by the first cylindrical hole; a first shaft extending into the piston, co-movable with the piston relative to the machine body along the first axis between first and second axial positions, and rotatable about the first axis relative to the piston, the first shaft having a splined end portion and a driven end portion opposite to the splined end portion; a first coupling unit; a second shaft extending into the second cylindrical hole and rotatable relative to the machine body about a second axis defined by the second cylindrical hole and parallel to the first axis, the first shaft being coupled to the second shaft through the first coupling unit when the first shaft is disposed at the first axial position, thereby permitting rotation of the second shaft about the second axis when the first shaft rotates about the first axis, and being decoupled from the second shaft when the first shaft is disposed at the second axial position; a rotary cutter holder mounted on the machine body, rotatable about the first axis relative to the machine body, and defining a third cylindrical hole that is coaxially disposed with the first cylindrical hole; a second coupling unit coupling the rotary cutter holder to the second shaft so as to permit the rotary cutter holder to be driven by the second shaft to rotate about the first axis relative to the machine body when the second shaft is driven by the first shaft to rotate about the second axis; a third shaft extending into the first and third cylindrical holes, and having a splined end portion, the splined end portion of the first shaft engaging the splined end portion of the third shaft when the first shaft is disposed at the second axial position, thereby permitting co-rotation of the first and third shafts about the first axis relative to the rotary cutter holder, and disengaging the splined end portion of the third shaft when the first shaft is disposed at the first axial position; and a driving unit mounted on the machine body and coupled to the driven end portion of the first shaft for driving rotation of the first shaft about the first axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
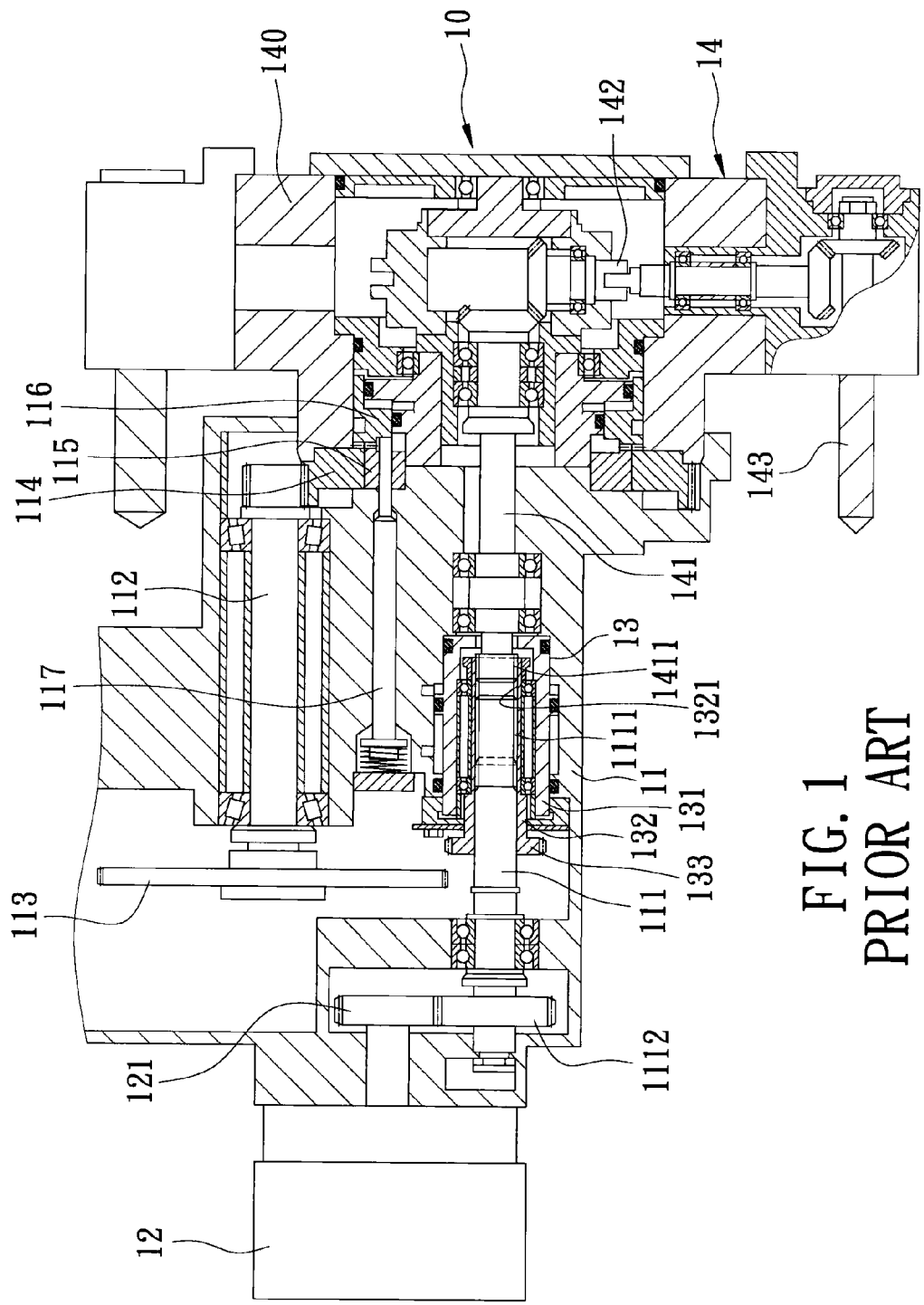
FIG. 1 is a fragmentary assembled sectional view of a conventional cutting machine.
Figure 2:
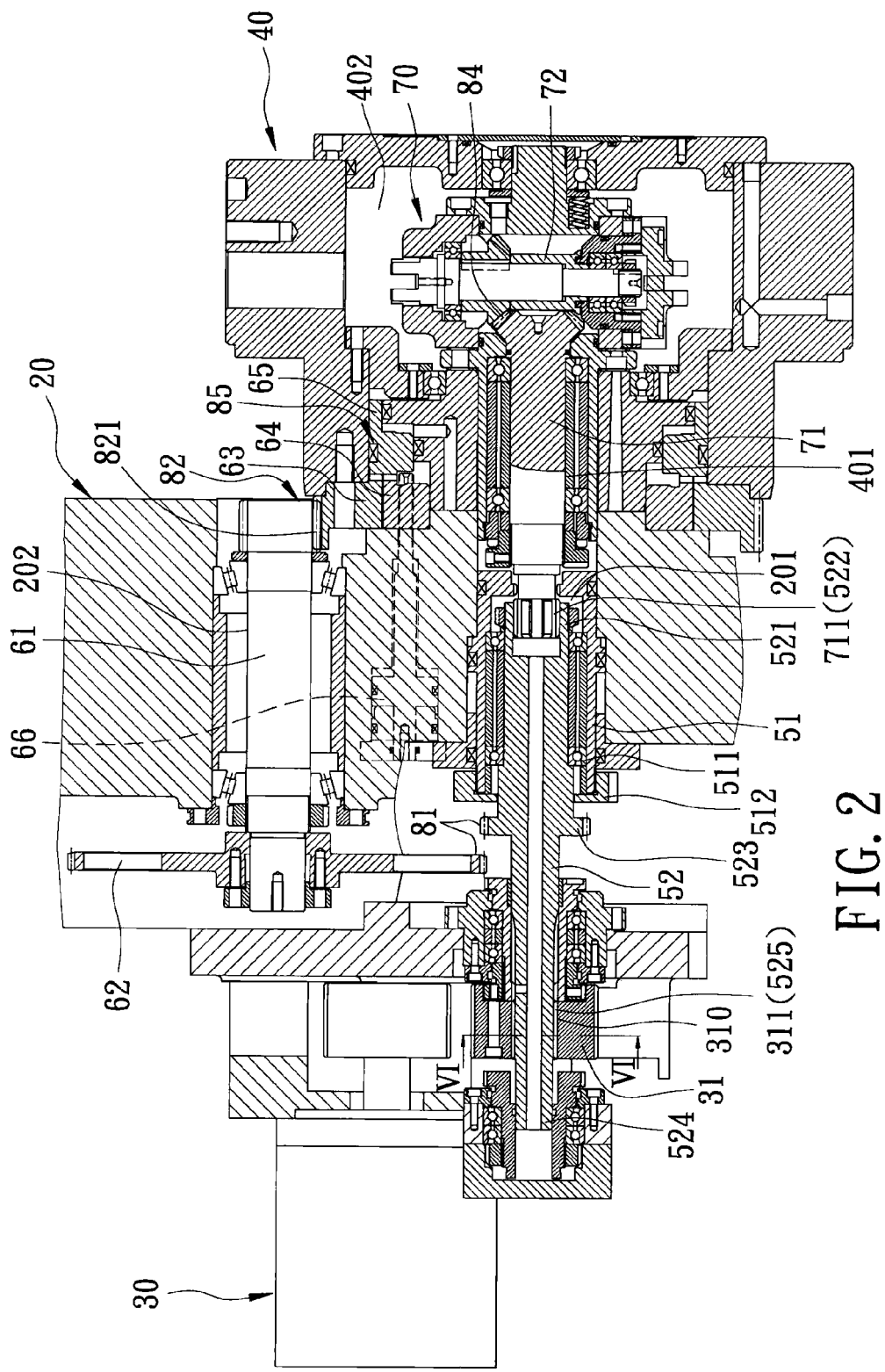
FIG. 2 is a fragmentary assembled sectional view of the preferred embodiment of a cutting machine according to the present invention.
Figure 3:
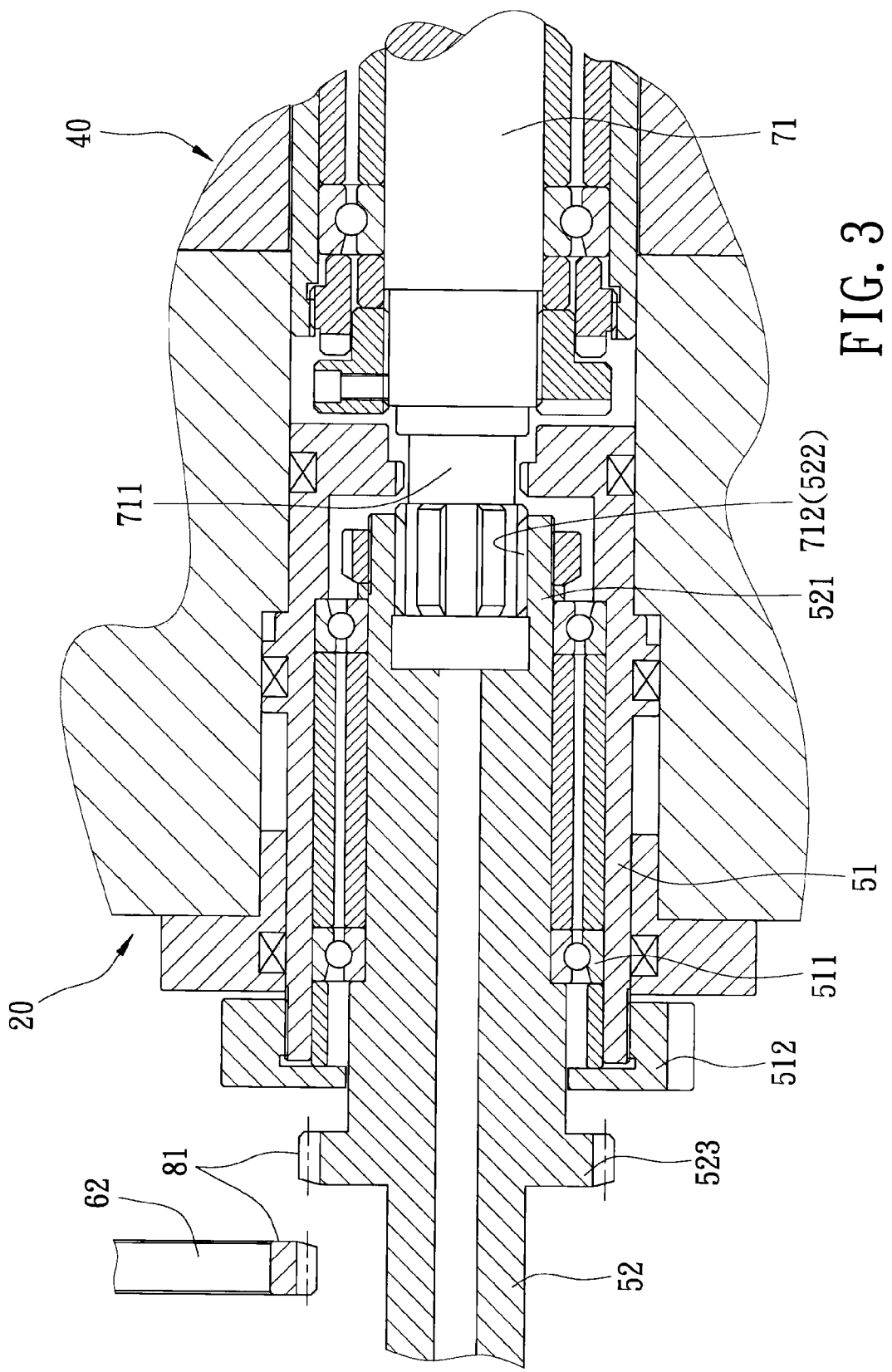
FIG. 3 is a fragmentary enlarged sectional view of the preferred embodiment to illustrate how a shaft engages another shaft through male and female spline gears for driving rotation of a tool.
Figure 4:
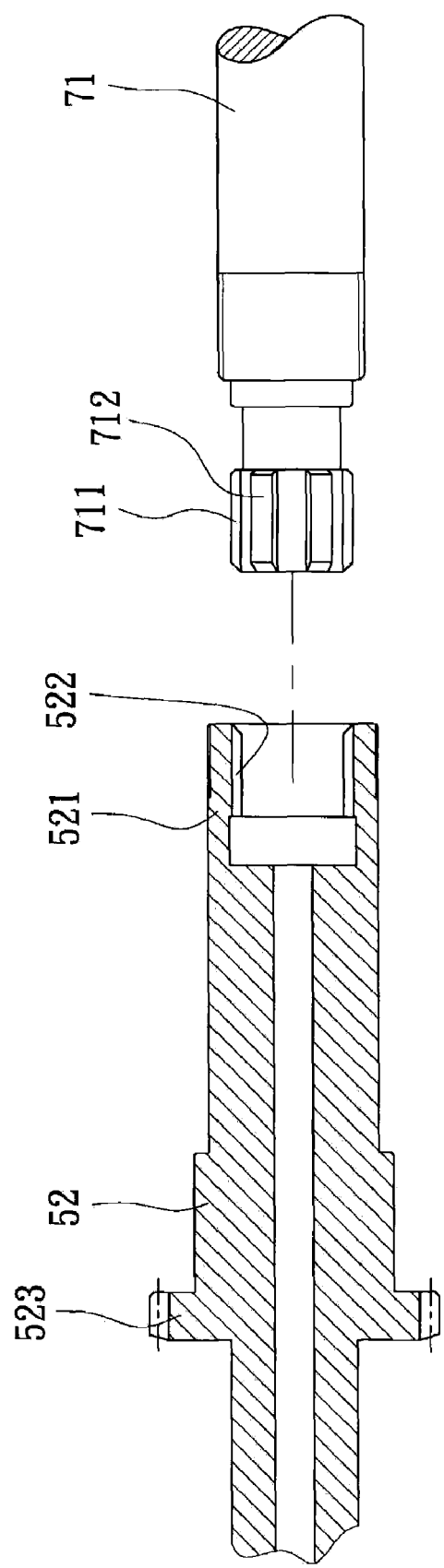
FIG. 4 is a fragmentary, exploded partly sectional view of the preferred embodiment to illustrate the structures of the male and female spline gears.
Figure 5:
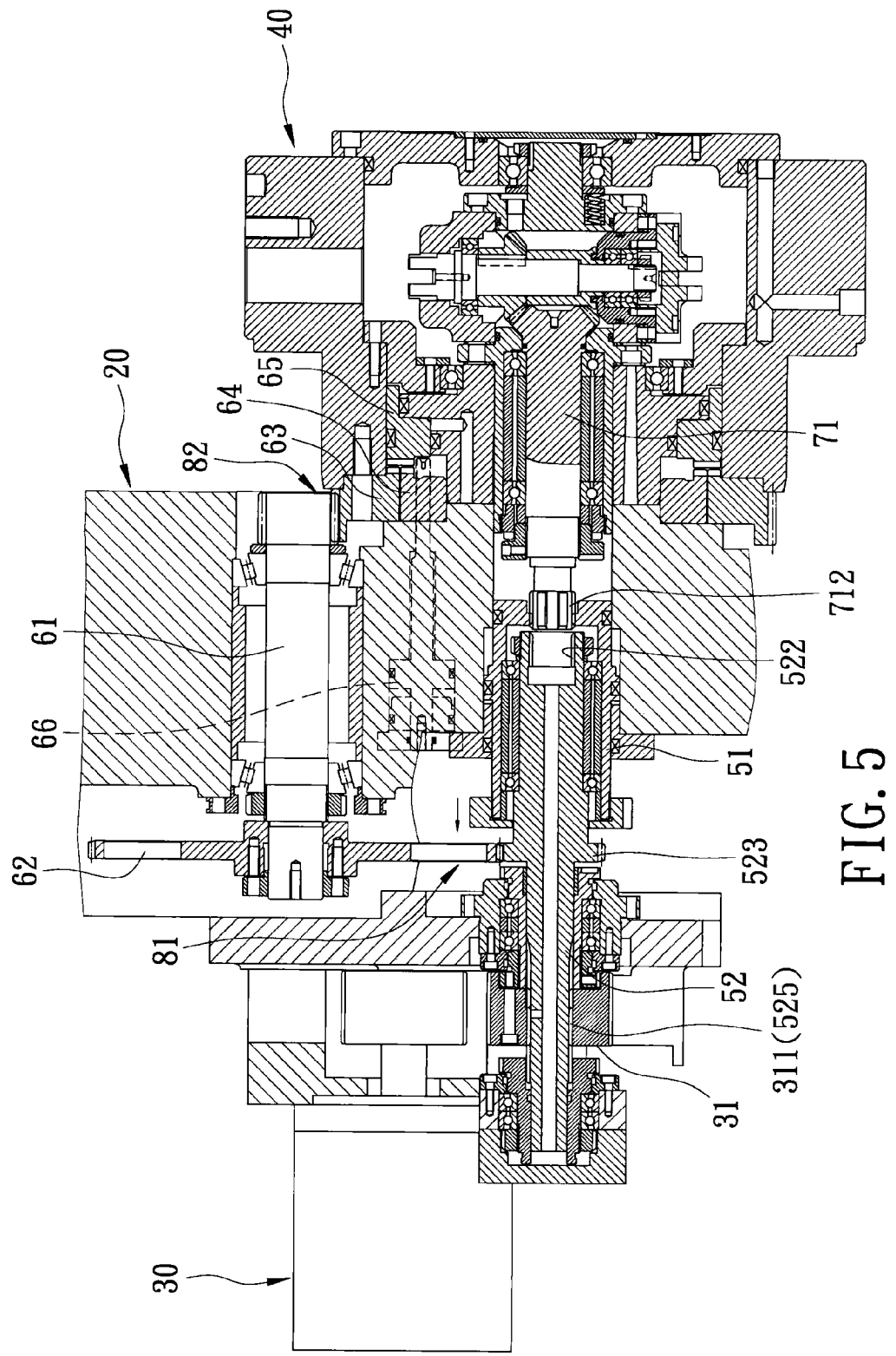
FIG. 5 is a fragmentary assembled sectional view of the preferred embodiment to illustrate how the first shaft engages the other shaft through general gears for driving rotation of a rotary cutter holder.
Figure 6:
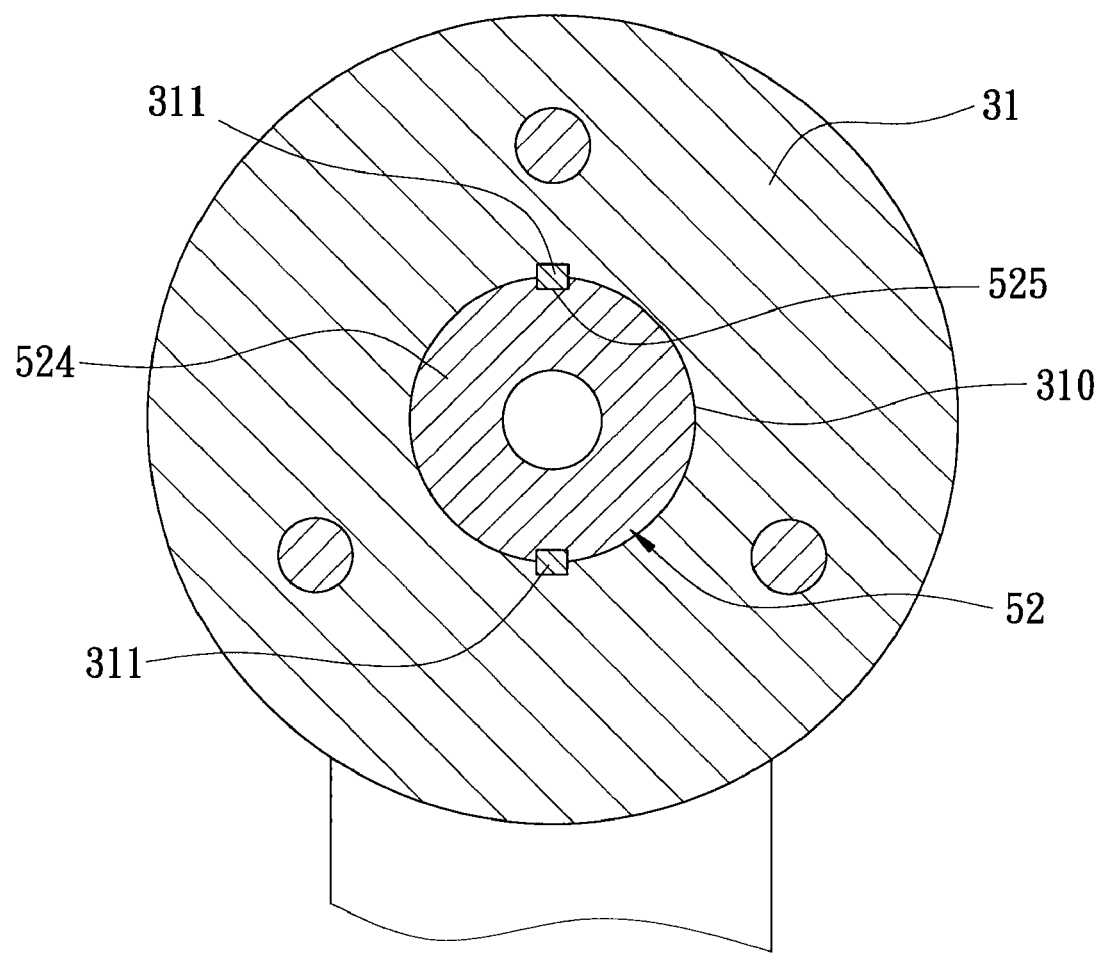
FIG. 6 is a sectional view taken along line VI-VI in FIG. 2 to illustrate how the first shaft engages a pulley through a key-and-keyway engaging manner.

Referring to FIGS. 2 to 6, the preferred embodiment of a cutting machine according to the present invention is shown to include: a machine body 20 defining parallel first and second cylindrical holes 201, 202; a hollow piston 51 extending into the first cylindrical hole 201 and movable along a first axis defined by the first cylindrical hole 201; a first shaft 52 extending into the piston 51, co-movable with the piston 51 relative to the machine body 20 along the first axis between first and second axial positions (see FIGS. 5 and 2), and rotatable about the first axis relative to the piston 51, the first shaft 52 having a splined end portion 521, and a driven end portion 524 opposite to the splined end portion 521; a first coupling unit 81; a second shaft 61 extending into the second cylindrical hole 202 and rotatable relative to the machine body 20 about a second axis defined by the second cylindrical hole 202 and parallel to the first axis, the first shaft 52 being coupled to the second shaft 61 through the first coupling unit 81 when the first shaft 52 is disposed at the first axial position, as shown in the FIG. 5, thereby permitting rotation of the second shaft 61 about the second axis when the first shaft 52 rotates about the first axis, and being decoupled from the second shaft 61 when the first shaft 52 is disposed at the second axial position, as best shown in FIGS. 2 and 3; a rotary cutter holder 40 mounted on the machine body 20, rotatable about the first axis relative to the machine body 20, and defining a third cylindrical hole 401 that is coaxially disposed with the first cylindrical hole 201; a second coupling unit 82 coupling the rotary cutter holder 40 to the second shaft 61 (see FIG. 5) so as to permit the rotary cutter holder 40 to be driven by the second shaft 61 to rotate about the first axis relative to the machine body 20 when the second shaft 61 is driven by the first shaft 52 to rotate about the second axis; a third shaft 71 extending into the first and third cylindrical holes 201, 401, and having a splined end portion 711, the splined end portion 521 of the first shaft 52 engaging the splined end portion 711 of the third shaft 71 when the first shaft 52 is disposed at the second axial position (see FIGS. 2 and 3), thereby permitting co-rotation of the first and third shafts 52, 71 about the first axis relative to the rotary cutter holder 40, and disengaging the splined end portion 711 of the third shaft 71 when the first shaft 52 is disposed at the first axial position (see FIGS. 4 and 5); and a driving unit 30 mounted on the machine body 20 and coupled to the driven end portion 524 of the first shaft 52 for driving rotation of the first shaft 52 about the first axis.

In this embodiment, the first coupling unit 81 has first and second gears 523, 62 that are provided on and that radiate from the first and second shafts 52, 61, respectively, and that engage each other when the first shaft 52 is disposed at the first axial position (see FIG. 5) and that disengage each other when the first shaft 52 is disposed at the second axial position, as shown in FIG. 2.

Referring to FIG. 4, the splined end portion 521 of the first shaft 52 is provided with a female spline gear 522, and the splined end portion 711 of the third shaft 71 is provided with a male spline gear 712 to be coupled to and decoupled from the female spline gear 522.

The rotary cutter holder 40 is mounted on one side of the machine body 20, and the driving unit 30 is mounted on an opposite side of the machine body 20 opposite to the rotary cutter holder 40, and includes a belt-and-pulley mechanism that has a pulley 31 defining a fourth cylindrical hole 310 which is disposed coaxially with the first cylindrical hole 201. The driven end portion 524 of the first shaft 52 extends into the fourth cylindrical hole 310 and engages the pulley 31 in such a manner to permit co-rotation of the pulley 31 and the first shaft 52 about the first axis and axial movement of the first shaft 52 along the first axis relative to the pulley 31 when the first shaft 52 is driven by the piston 51. In this embodiment, the driven end portion 524 is further formed with a pair of diametrically opposite keyways 525 (see FIG. 6). The pulley 31 is provided with a pair of diametrically disposed keys 311 extending slidably into the keyways 525 so as to permit the first shaft 52 to slide along the first axis relative to the belt-and-pulley mechanism. It should be noted that the keyways can be formed in the pulley 31 and the keys can be provided on the driven end portion 524 of the first shaft 52 in an alternative way.

The second coupling unit 82 has a gear set 821 provided on the second shaft 61 and an outer race 63 of the rotary cutter holder 40.

The rotary cutter holder 40 further defines a shaft-receiving space 402 in spatial communication with the third cylindrical hole 401. The cutting machine further includes a fourth shaft 72 mounted in the shaft-receiving space 402 and coupled to the third shaft 71 through a second gear set 84 and to a tool (not shown) for driving rotation of the tool.

The piston 51 is provided with a bearing set 511 for supporting the first shaft 52, and a claw 512 for limiting rotation of the piston 51 when the first shaft 52 rotates about the first axis.

To prevent the rotary cutter holder 40 from rotating undesirably, a locking unit 85 is provided to lock the rotary cuter holder 40 against rotation. The locking unit 85 includes an inner race 64 fitted into the outer race 63 and fixed to the machine body 20, a meshing piston 65 movable to couple the inner and outer races 64, 63 together so as to lock the rotary cutter holder 40 to the machine body 20, and a driving shaft 66 operable to move the meshing piston 65 away from the inner and outer races 64, 63 to decouple the inner and outer races 64, 63 so as to release the rotary cutter holder 40 from the machine body 40.

In operation, the piston 51 is powered by a hydraulic system (not shown) to move along the first axis toward the rotary cutter holder 40 to the second axial position (see FIGS. 2 and 3) so as to decouple the first and second gears 523, 62 and to couple the male and female spline gears 522, 712, thereby enabling the driving unit 30 to drive rotation of the fourth shaft 72 through the first and third shafts 52, 71.

On the other hand, if it is desired to rotate the rotary cutter holder 40, referring to FIG. 5, the piston 51 is powered by the hydraulic system to move away from the rotary cutter holder 40 along the first axis to the first axial position so as to decouple the male and female spline gears 522, 712 and to couple the first and second gears 523, 62. The driving shaft 66 is then moved to drive movement of the meshing piston 65 so as to disengage the inner and outer races 64, 63 in order to unlock the rotary cutter holder 40 and to permit rotation of the same through rotation of the first shaft 52 upon actuation of the driving unit 30.

By providing the first shaft 52 with the spline gear 522 and by journaling the first shaft into the piston 51 of the cutting machine of this invention in such a manner that the former is axially movable relative to the piston 51 and is rotatable relative to the piston 51, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A cutting machine comprising:
    a machine body defining parallel first and second cylindrical holes;
    a hollow piston extending into said first cylindrical hole and movable along a first axis defined by said first cylindrical hole;
    a first shaft extending into said piston, co-movable with said piston relative to said machine body along the first axis between first and second axial positions, and rotatable about the first axis relative to said piston, said first shaft having a splined end portion and a driven end portion opposite to said splined end portion;
    a first coupling unit;
    a second shaft extending into said second cylindrical hole and rotatable relative to said machine body about a second axis defined by said second cylindrical hole and parallel to the first axis, said first shaft being coupled to said second shaft through said first coupling unit when said first shaft is disposed at the first axial position, thereby permitting rotation of said second shaft about the second axis when said first shaft rotates about the first axis, and being decoupled from said second shaft when said first shaft is disposed at the second axial position;
    a rotary cutter holder mounted on said machine body, rotatable about the first axis relative to said machine body, and defining a third cylindrical hole that is coaxially disposed with said first cylindrical hole;
    a second coupling unit coupling said rotary cutter holder to said second shaft so as to permit said rotary cutter holder to be driven by said second shaft to rotate about the first axis relative to said machine body when said second shaft is driven by said first shaft to rotate about the second axis;
    a third shaft extending into said first and third cylindrical holes, and having a splined end portion, said splined end portion of said first shaft engaging said splined end portion of said third shaft when said first shaft is disposed at the second axial position, thereby permitting co-rotation of said first and third shafts about the first axis relative to said rotary cutter holder, and disengaging said splined end portion of said third shaft when said first shaft is disposed at the first axial position; and
    a driving unit mounted on said machine body and coupled to said driven end portion of said first shaft for driving rotation of said first shaft about the first axis.

2. The cutting machine of claim 1, wherein said first coupling unit has first and second gears that are provided on and that radiate from said first and second shafts, respectively, and that engage each other when said first shaft is disposed at the first axial position, and that disengage each other when said first shaft is disposed at the second axial position.

3. The cutting machine of claim 1, wherein said rotary cutter holder is mounted on one side of said machine body, said driving unit being mounted on an opposite side of said machine body opposite to said rotary cutter holder, and including a belt-and-pulley mechanism that has a pulley defining a fourth cylindrical hole which is disposed coaxially with said first cylindrical hole, said driven end portion of said first shaft extending into said fourth cylindrical hole and engaging said pulley in such a manner to permit co-rotation of said pulley and said first shaft about the first axis and axial movement of said first shaft along the first axis relative to said pulley when said first shaft is driven by said piston.

4. The cutting machine of claim 3, wherein one of said pulley and said driven end portion of said first shaft is formed with two diametrically disposed keyways, and the other of said pulley and said driven end portion of said first shaft is provided with two diametrically disposed keys extending slidably into said keyways, respectively.

5. The cutting machine of claim 1, wherein said second coupling unit has a first gear set provided on said second shaft and said rotary cutter holder.

6. The cutting machine of claim 1, wherein said rotary cutter holder further defines a shaft-receiving space in spatial communication with said third cylindrical hole, said cutting machine further comprising a second gear set and a fourth shaft mounted in said shaft-receiving space and coupled to said third shaft through said second gear set.

* * * * *